(12) United States Patent
Jenkins et al.

(10) Patent No.: US 8,941,746 B2
(45) Date of Patent: Jan. 27, 2015

(54) INSTALLATION FOR CONVEYING SIGNALS BETWEEN A VIDEO CAMERA EQUIPMENT AND A REMOTE EQUIPMENT

(75) Inventors: Keith Jenkins, Berkshire (GB); Gary Wordsworth, Buckinghamshire (GB); David Pether, Berkshire (GB); Philip Longhurst, Sussex (GB); Christopher Hamblin, Sussex (GB); Gareth Foster, Sussex (GB)

(73) Assignee: Interlemo Holding S.A., Ecublens (CH)

( * ) Notice: Subject to any disclaimer, the term of this patent is extended or adjusted under 35 U.S.C. 154(b) by 0 days.

(21) Appl. No.: 14/110,001

(22) PCT Filed: Apr. 2, 2012

(86) PCT No.: PCT/IB2012/051602
§ 371 (c)(1),
(2), (4) Date: Oct. 4, 2013

(87) PCT Pub. No.: WO2012/137127
PCT Pub. Date: Oct. 11, 2012

(65) Prior Publication Data
US 2014/0055637 A1  Feb. 27, 2014

(30) Foreign Application Priority Data
Apr. 4, 2011 (EP) .................................. 11161014

(51) Int. Cl.
| H04N 5/232 | (2006.01) |
|---|---|
| H04N 5/225 | (2006.01) |
| H04N 9/475 | (2006.01) |
| H04N 5/06 | (2006.01) |
| G03B 17/00 | (2006.01) |
| H04N 1/04 | (2006.01) |
| H04N 5/46 | (2006.01) |
| H04N 7/18 | (2006.01) |
| H04N 7/22 | (2006.01) |

(52) U.S. Cl.
CPC ................. *H04N 5/225* (2013.01); *H04N 5/46* (2013.01); *H04N 7/181* (2013.01); *H04N 7/22* (2013.01); *H04N 5/23203* (2013.01); *H04N 5/23241* (2013.01)
USPC ...... 348/211.14; 348/359; 348/512; 348/521; 396/267; 358/484

(58) Field of Classification Search
CPC ............................. H04N 5/073; H04N 5/0733
USPC ............... 348/211.14, 211.99, 335, 359, 512, 348/513, 521, 522, 722; 396/267; 358/484
See application file for complete search history.

(56) References Cited

U.S. PATENT DOCUMENTS 5,486,853 A * 1/1996 Baxter et al. ................ 348/222.1
5,696,553 A * 12/1997 D'Alfonso et al. ...... 348/211.14
(Continued)

FOREIGN PATENT DOCUMENTS

EP          1 758 280 A      2/2007

OTHER PUBLICATIONS

Search Report issued by European Patent Office for priority application EP 11161014 dated Mar. 15, 2012.

*Primary Examiner* — Sinh Tran
*Assistant Examiner* — Mark Monk
(74) *Attorney, Agent, or Firm* — Ronald R. Santucci; Frommer Lawrence & Haug LLP

(57) ABSTRACT

Adapter (3, 5) for processing electrical signals in an installation comprising a video camera equipment (1) and a remote equipment (7). A first aim of the present invention is to provide an adapter system which allows automatically providing an output video signal that is co-timed to the master timing reference of the remote equipment. A second aim of the invention is to provide an adapter system which improves the security of the installation when power for the camera is transmitted by the remote equipment.

18 Claims, 5 Drawing Sheets

(56) References Cited

U.S. PATENT DOCUMENTS

| | | | |
|---|---|---|---|
| 7,209,848 B2 * | 4/2007 | Jiang et al. | 702/107 |
| 7,327,959 B2 | 2/2008 | Pelletier et al. | |
| 7,474,852 B1 | 1/2009 | Jachetta et al. | |
| 7,889,239 B2 * | 2/2011 | Nakajima | 348/211.14 |
| 8,233,805 B2 * | 7/2012 | Tatum et al. | 398/141 |
| 2005/0174435 A1 | 8/2005 | Nakajima | |
| 2009/0175271 A1 | 7/2009 | Tapie et al. | |

* cited by examiner

INSTALLATION FOR CONVEYING SIGNALS BETWEEN A VIDEO CAMERA EQUIPMENT AND A REMOTE EQUIPMENT

This application is a 371 of PCT/IB2012/051602 filed on Apr. 2, 2012, published on Oct. 11, 2012 under publication number WO 2012/137127 A, which claims priority benefits to European Patent Application 11161014.3 filed Apr. 4, 2011, the entire disclosure of which is incorporated herein by reference.

The present invention concerns the field of signals processing devices for installations used for television broadcasting. The invention relates in particular to an adapter for processing electrical signals in an installation comprising a video camera equipment and a remote equipment. The invention relates also to an adapter system.

In many television recording situations, a camera is often remote from the production or recording equipment. The camera may for example be on a studio floor while the recording device or vision mixing equipment is in a different room. During outside broadcasts, the remote control, production or recording equipment is often in a van remote from where a scene is being played out and, at some sports events, for example race tracks, it is a requirement for the camera to be at a considerable distance from the production facility or the outside broadcast van. Video, audio, intercom, control and other data are thus sent to and from the camera. The use of adapters and adapter systems, connected between a television camera and a remote equipment, for conveying signals between the camera and a remote equipment is thus already widely known.

To establish the necessary connexion between a television camera and a remote equipment, many manufacturers make cameras and remote equipments that are connected by a tri-axial cable. EP 1 758 280 from the same applicant discloses for instance a system in which an adapter system is connected between a television camera and a remote equipment. This adapter system comprises a first and a second interface, the first interface being connected to the television camera by means of a first triaxial cable and the second interface being connected to the remote equipment by means of a second triaxial cable. The drawback of such triaxial cables is however that they suffer increasing signal degradation with the cable length.

To remedy this drawback, the applicant has made use of adapter systems in which a first adapter is connected to a second adapter by means of fibre optic links. The Mongoose CSV, later renamed Zlink, was disclosed at IBC between 14 Sep. 2001 and 18 Sep. 2001. This is an example of such an adapter system where a first interface can be linked to a second interface by an optical fibre optic cable.

U.S. Pat. No. 7,327,959 (B2) discloses another example of a system in which a television camera is connected to a base unit by means of an optical fibre cable. These links can cover greater ranges but require much more expensive cameras.

On the other hand, it is often desirable in a television production, routing or transmission facility that all the signals are locked to the frequency of a master timing reference and co-timed with the reference. To reach this goal, it is known to make use of a timing reference signal which is fed from the remote equipment to a remote adapter. The remote adapter advances the timing information sent to the camera such that the program video signal emerging from the remote adapter has the same timing as the timing reference signal. However, very low cost cameras, such as high end amateur cameras, do not have the facility to lock to a timing reference. These cameras have not been supported in the prior art unless the program video output from the remote adapter was fed to an external synchroniser. However, providing the camera with an advanced timing reference is preferable to using a synchroniser as the synchroniser matches the frequency by skipping or repeating video frames or fields, leading to motion discontinuities.

A first aim of the present invention is thus to improve the prior art installations by providing an adapter system which allows automatically providing an output video signal that is co-timed to the master timing reference of the remote equipment.

Apart from this aspect, there is sometimes a facility to send power to the camera on copper conductors in a hybrid optical fibre cable. To reduce the cable losses the voltages used are hazardous (typically 100 to 300V DC or AC) and to reduce the risk of electrocution an interlock is used. When switched on, low voltage is sent to the first (camera) adapter and the first adapter indicates its presence to the second (remote) adapter, for example by superimposing an AC tone on the DC feed. Only when this signal is received does the remote adapter apply the hazardous voltage to the cable. Typically the remote adapter also has circuitry to detect open or short circuits between the load conductors and/or the protective screen. These measures provide good but not infallible protection against the connectors in the cable being opened, or the cable itself being damaged.

A second aim of the invention is thus to provide an adapter system which improves the security of the installation when power for the camera is transmitted by the remote equipment.

According to the invention, an adapter for processing electrical signals in an installation comprising a video camera equipment and a remote equipment comprises
- a digital coding multiplexing and serialising circuit,
- one or more optical transmitters, which inputs are connected to the digital coding multiplexing and serialising circuit,
- a de-serialising de-multiplexing and digital decoding circuit,
- one or more optical receivers, which outputs are connected to the de-serialising de-multiplexing and digital decoding circuit,
- a timing reference encoding circuit, able to provide an adjusted version of the digital representation of a timing reference signal, which output is connected to the digital coding multiplexing and serialising circuit,
- a video frame synchroniser, able to delay a program video output, and
- a genlock monitoring and control circuit, able to compare the timing of the program video output and the adjusted version of the digital representation of a timing reference signal provided by the timing reference encoding circuit, able to control both the timing reference encoding circuit and the video frame synchroniser and able to adjust the timing reference encoding circuit to match the timing of the program video output to the adjusted version of the digital representation of a timing reference signal provided by the timing reference encoding circuit or to control the video frame synchroniser to synchronise the program video output to the adjusted version of the digital representation of a timing reference signal provided by the timing reference encoding circuit.

According to the invention, the adapter can comprise a first set of one or more analog-to-digital converters which outputs are connected to the digital coding multiplexing and serialising circuit.

According to the invention, the adapter can comprise a first set of one or more digital interfaces which outputs are connected to the digital coding multiplexing and serialising circuit.

According to the invention, the adapter can comprise a first set of one or more digital-to-analog converters which inputs are connected to the de-serialising de-multiplexing and digital decoding circuit.

According to the invention, the adapter can comprise a second set of one or more digital interfaces which inputs are connected to the de-serialising de-multiplexing and digital decoding circuit.

According to the invention, the adapter can comprise a second set of one or more analog-to-digital converters which outputs are connected to the timing reference encoding circuit.

According to the invention, the adapter can comprise a third set of digital interfaces which outputs are connected to the timing reference encoding circuit.

According to the invention, the adapter can comprise a fourth set of digital interfaces which inputs are connected to the video frame synchroniser.

According to the invention, the adapter can comprise a second set of one or more digital-to-analog converters which inputs are connected to the video frame synchroniser.

According to the invention, the timing reference encoding circuit can comprise adjusting means able to delay the digital representation of a timing reference signal for providing the adjusted version of the digital representation of a timing reference signal.

According to the invention, the timing reference encoding circuit can comprise adjusting means able to advance the digital representation of a timing reference signal which allow for providing the adjusted version of the digital representation of a timing reference signal.

According to the invention, the video frame synchroniser can be able to freeze the video program output and to mask picture disturbances.

According to the invention, the adapter can comprise a power supply circuit fed from a line input, a high impedance circuit able to balance the potential of the output terminals of the power supply circuit with ground, a voltage balance trip circuit which compares the potential of the two output terminals of the power supply circuit relative to a protective screen and which is able to isolate the output terminals, an isolating device that is activated when the voltage balance trip circuit detects an imbalance, an over current breaker circuit which is able to disconnect the output terminals if an excessive current flows and a residual current breaker that isolates the output terminals if the current flowing in each conductor differs by more than a safe threshold.

According to the invention, an adapter system for processing electrical signals in an installation comprising a video camera equipment and a remote equipment comprises a first adapter, said first adapter comprising
  a digital coding multiplexing and serialising circuit,
  one or more optical transmitters which inputs are connected to the digital coding multiplexing and serialising circuit,
  a de-serialising de-multiplexing and digital decoding circuit,
  one or more optical receivers which outputs are connected to the de-serialising de-multiplexing and digital decoding circuit and said adapter system comprises a second adapter as described above.

According to the invention, the first adapter can comprise a power converter circuit.

According to the invention, the first adapter and the second adapter can comprise a wavelength division multiplexer which is able to split a combined optical signal in several independent optical signals.

According to the invention, the first adapter and the second adapter can be connected by a cable comprising at least one optical fibre.

According to the invention, the first adapter and the second adapter can be connected by a cable comprising at least one optical fibre and copper conductors.

The foregoing and other features and advantages of the invention will be apparent from the following description of the preferred embodiments of the invention, as illustrated in the accompanying drawings.

Figure 5:
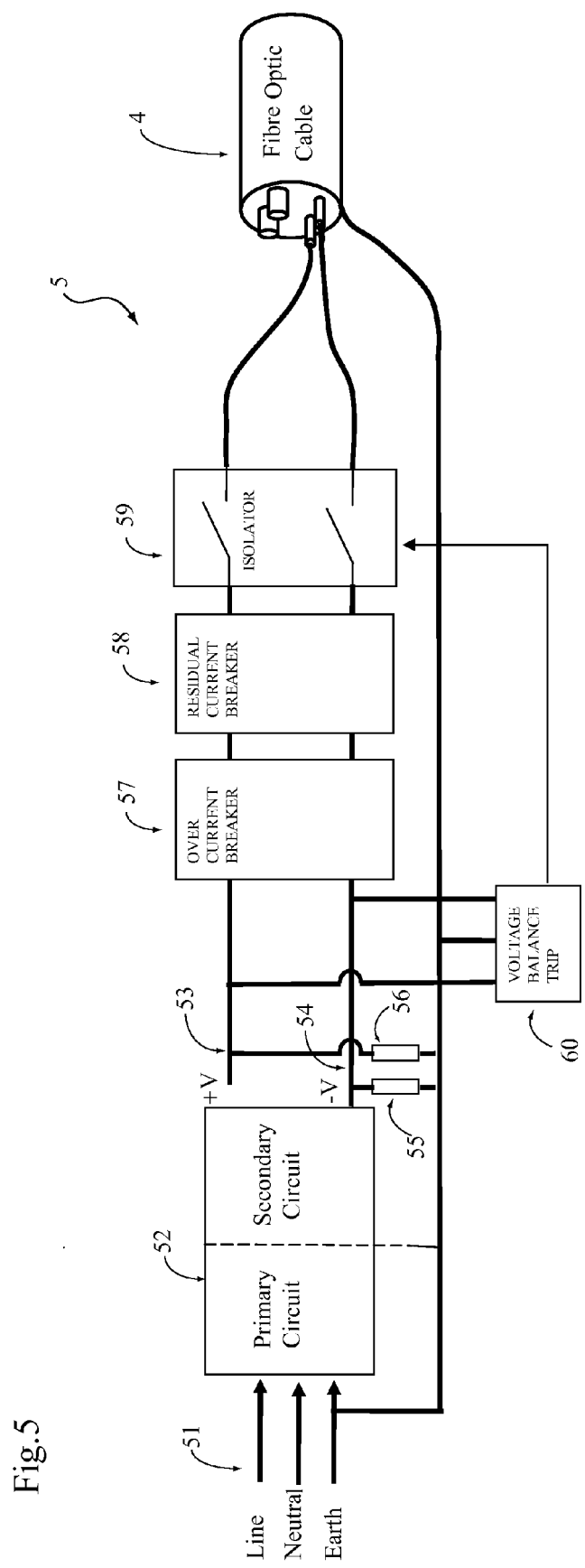

FIG. 5 partially shows an adapter according to another embodiment of the present invention.

Figure 1:
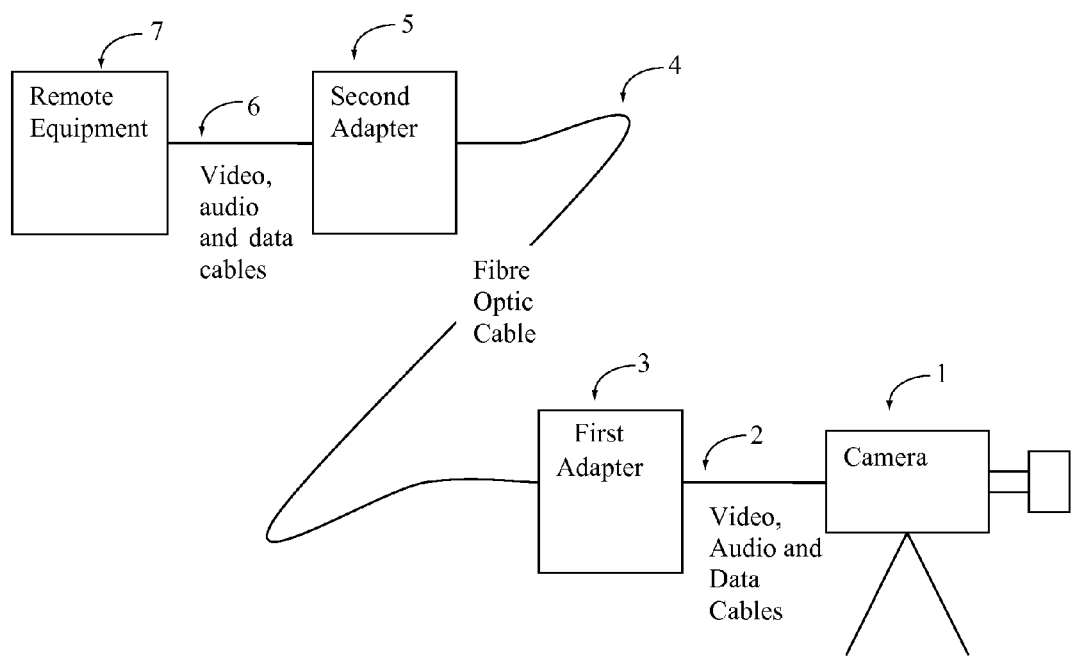
FIG. 1 shows a schematic view of an adapter system according to the invention.

FIG. 1 shows an installation which comprises a video camera equipment 1, a remote equipment 7 and an adapter system according to the invention. A video camera equipment according to the present invention can be a television camera, a camcorder, any kind of apparatus that takes both a video sequence and an audio signal and/or includes video or audio recording facilities. The adapter system consists in a first adapter 3 and a second adapter 5. The adapter system allows processing electrical signals transmitted to and received from the video camera equipment 1 and electrical signals transmitted to and received from the remote equipment 7. The first adapter 3 can be connected by means of video, audio and data cables 2 to the video camera equipment 1 and the second adapter 5 can be connected by means of video, audio and data cables 6 to the remote equipment 7. A remote equipment according to the present invention can be any kind of production facility such as production room, production van, a video recording device or a screen. As shown in the figure, the first adapter 3 and the second adapter 5 of the adapter system can be connected together by means of a cable 4. This cable 4 comprises at least one optical fibre cable but it can alternatively be a hybrid cable, in particular it can comprise several optical fibres and copper conductors.

The first adapter 3 allows converting optical signals received over the cable 4 to electrical signals and transmitting these electrical signals to the video camera equipment 1. It further allows converting electrical signals emitted by the camera 1 into optical signals and transmitting these optical signals over the cable 4 to the second adapter 7. Similarly, the second adapter 5 allows converting optical signals received over the cable 4 to electrical signals and transmitting these signals to the remote equipment 7. It allows also converting electrical signals emitted by the remote equipment 7 into optical signals and transmitting these optical signals over the cable 4 to the first adapter 3.

Figure 2:
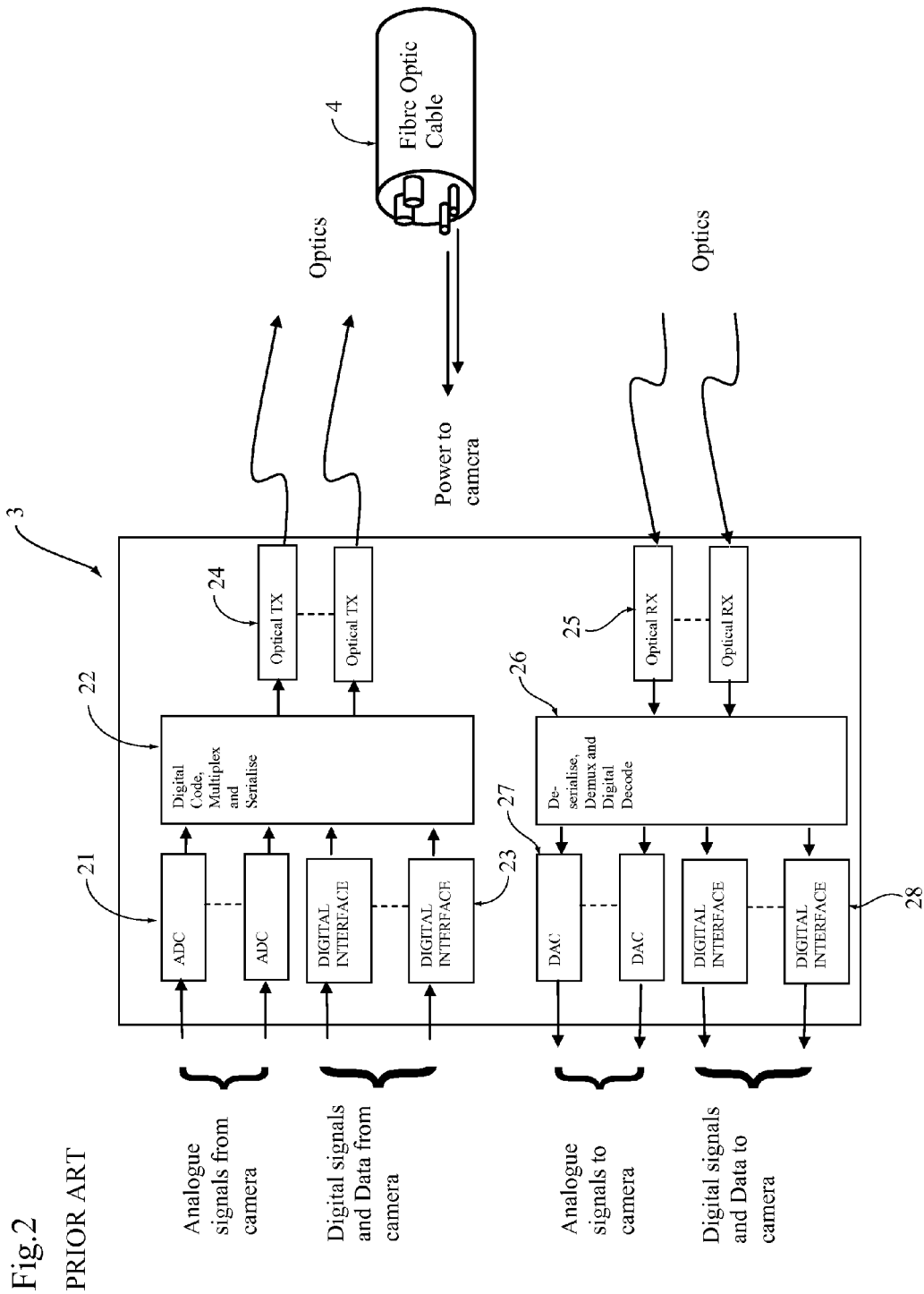
FIG. 2 shows a diagram of a prior art adapter that can be connected to a video camera equipment.

FIG. 2 shows a diagram of a first adapter 3 of an adapter system according to the prior art.

The first adapter 3 comprises one or more analog-to-digital converters 21 which inputs can be connected to analogue outputs of the video camera equipment 1 via dedicated plugs and connectors as well known in the art. Alternatively or in addition to these analog-to-digital converters 21, the first adapter comprises one or more digital interfaces 23 which inputs are also linked to plugs connectable to digital outputs of a video camera equipment 1 via dedicated plugs and connectors. The analog-to-digital converters 21 transform the analogue signals output by the video camera equipment 1 to digital signals. Outputs of the analog-to-digital converters 21 and of the digital interfaces 23 are further connected to a digital coding multiplexing and serialising circuit 22 that codes, multiplexes and converts the digital information to serial digital streams. Outputs of this circuit 22 are further connected to one or more optical transmitters 24 which are connectable via dedicated plugs and connectors to a cable 4 which comprises at least one optical fibre. With these modules, the first adapter 3 is thus able to transform electrical signals coming out of the video camera equipment 1 into optical signals that can be transmitted via an optical fibre cable 4.

The first adapter 3 further comprises means for converting optical signals received over the cable 4 into electrical signals and for transmitting these electrical signals to the video camera equipment 1. The first adapter 3 comprises one or more digital-to-analog converters 27, which outputs can be connected directly to analogue inputs of the camera 1, via dedicated plugs and connectors, and which inputs are connected to a de-serialising de-multiplexing and digital decoding circuit 26. Alternatively or in addition to these digital-to-analog converters, the first adapter 3 comprises one or more digital interfaces 28 which inputs are also connected to the de-serialising de-multiplexing and digital decoding circuit 26 and which outputs are again directly connectable to digital inputs of the video camera equipment 1 through dedicated plugs and connectors. Inputs of the de-serialising de-multiplexing and digital decoding circuit 26 are connected to outputs of one or more optical receivers 25 which are connectable, via dedicated plugs and connectors, to a cable 4 which comprises at least one optical fibre. These modules allow the first adapter 3 to transform optical signals received over the cable 4 to electrical signals that can be fed to the video camera equipment 1.

Figure 3:
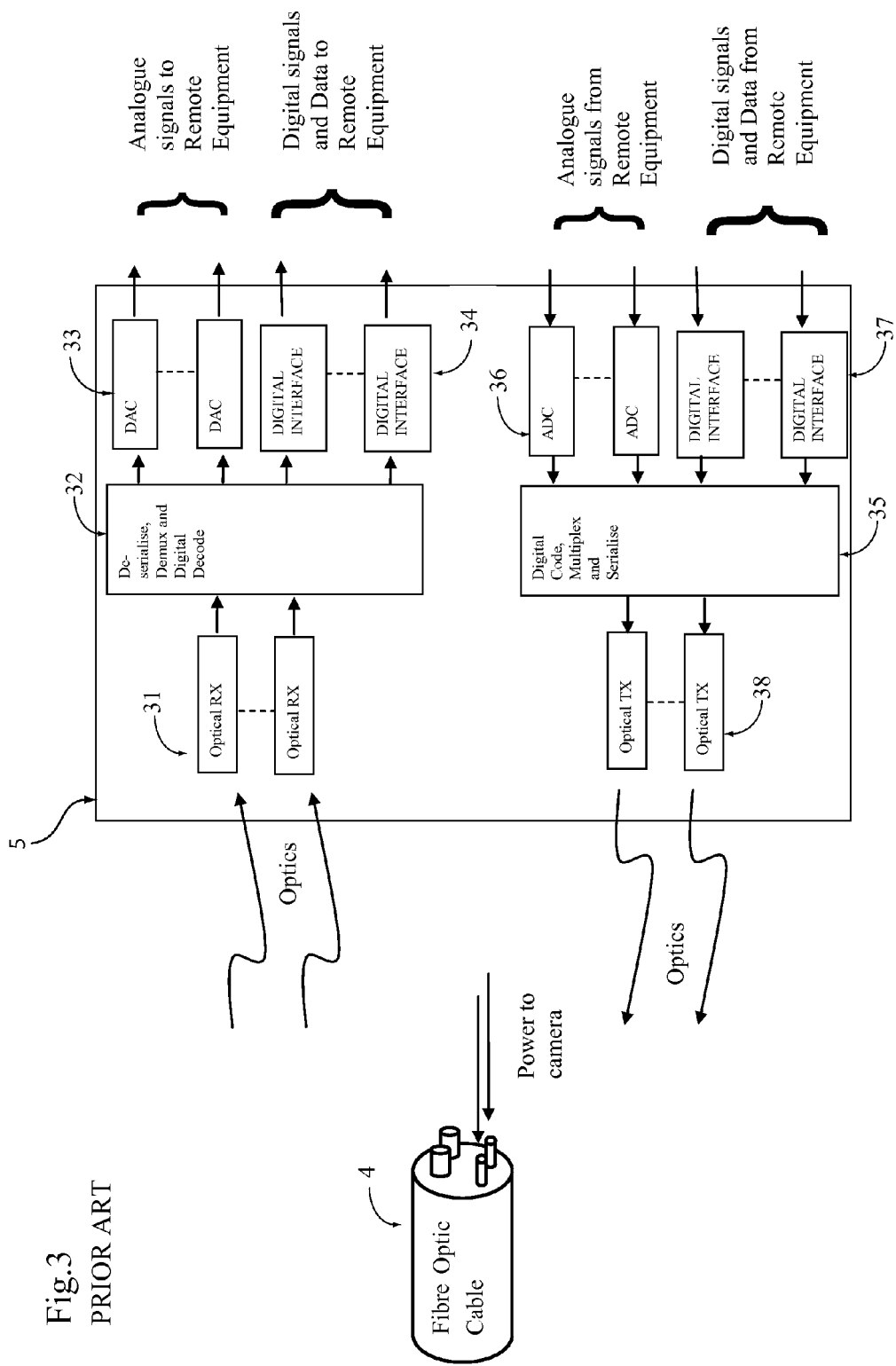
FIG. 3 shows a diagram of another prior art adapter that can be connected to a remote equipment.

FIG. 3 shows a second adapter 5 of an adapter system according to the prior art.

The second adapter 5 is basically, but not exactly, a mirror image of the first adapter 3. The second adapter 5 comprises means for converting optical signals received over the cable 4 into electrical signals and transmitting these electrical signals to the remote equipment 7. The second adapter 5 comprises one or more optical receivers 31 which inputs are connectable to the cable 4, via dedicated plugs and connectors, and which outputs are connected to a de-serialising de-multiplexing and digital decoding circuit 32. This circuit 32 is further connected to one or more digital-to-analog converters 33 which are able to reconstruct analogue signals from digital streams. Outputs of these converters 33 are directly connectable to the remote equipment 7, via dedicated plugs and connectors. Alternatively or in addition to the digital-to-analog converters 33, outputs of the de-serialising de-multiplexing and digital decoding circuit 32 are also connected to one or more digital interfaces 34 which are able to convey digital signals and which outputs are also directly connectable to the remote equipment 7.

Moreover, the second adapter 5 comprises also means for converting signals sent from the remote equipment 7 and transmitting converted signals to the video camera equipment 1, via the cable 4 and first adapter 3. To provide these functionalities, the second adapter comprises one or more analog-to-digital converters 36 which inputs are directly connectable to the remote equipment 7, via dedicated plugs and connectors, and which outputs are connected to a digital coding serialising and multiplexing circuit 35. Alternatively or in addition to these analog-to-digital converters 36, the second adapter 7 comprises one or more digital interfaces 37 which inputs can be directly connected, via dedicated plugs and connectors, to the remote equipment 7 and which outputs are also connected to the digital coding serialising and multiplexing circuit 35. Outputs of this circuit 35 are connected to one or more optical transmitters 36 which outputs can be connected, via dedicated plugs and connectors, to the cable 4.

Figure 4:
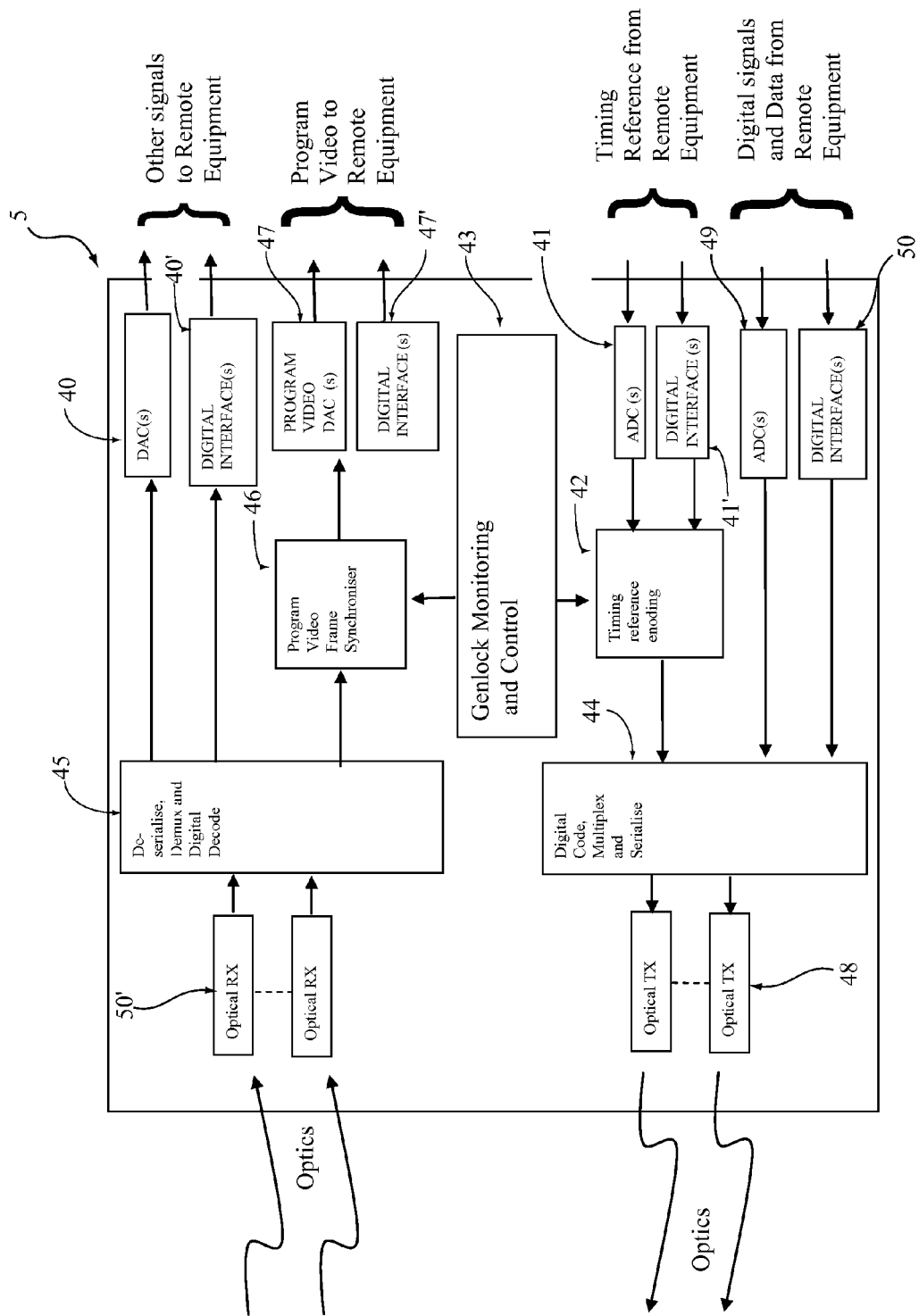
FIG. 4 shows a diagram of an adapter according to an embodiment of the present invention.

FIG. 4 shows an adapter according to the present invention. This adapter includes additional modules that can be implemented in the first adapter 3 or in the second adapter 5. In an adapter system according to a first embodiment of the invention, shown in FIG. 4, in order to limit the weight carried by the cameraman, these additional modules are included in the second adapter 5. An adapter system according to the first embodiment of the present invention thus comprises a first adapter which is essentially the same as the one described in relation with FIG. 2 and a second adapter which includes the additional modules which will be described in details hereunder. In an adapter system according to a second embodiment of the present invention, the additional modules are included in the first adapter 3 and the adapter system according to the second embodiment of the invention thus comprises a second adapter which is essentially the same as the one described in relation with FIG. 3 and a first adapter including the additional modules.

FIG. 4 shows a diagram of the second adapter 5 according to the first embodiment of the invention where it is the second adapter that includes the additional modules. A first adapter according to the second embodiment of the invention would in fact be basically the same as the adapter shown in FIG. 2.

In addition to the modules described above in relation with FIG. 3, the second adapter 5 of an adapter system according to the first embodiment of the invention further comprises means for conveying a timing reference signal output by the remote equipment 5. This timing reference signal may be analogue or digital. If this signal is analogue, output of the remote equipment which provides this timing reference signal can be connected, via dedicated plugs and connectors, to inputs of one or more analog-to-digital converters 41 provided in the second adapter 5. Alternatively or in addition to these analog-to-digital converters 41, the second adapter comprises one or more digital interfaces 41' to which digital outputs of the remote equipment 7 providing the timing reference signal may be connected if the timing reference signal is digital. The second adapter may thus comprise either the analog-to-digital converters 41 or the digital interfaces 41' or both. The outputs of the analog-to-digital converters 41 and of the digital interfaces 41' are connected to a timing encoding circuit 42 that provides an adjusted version of the digital representation of the timing reference signal and that, in order to provide this adjusted version, comprises means for advancing or delaying the digital representation of the timing reference signal. Several means of timing adjustment are well known to experts in the field. For example one embodiment is a counter that counts through the period of the timing reference signal and is reset at the end of the period. When the counter reaches the required timing offset, it in turn triggers a circuit that recreates the periodic timing waveforms starting from the trigger. This results in a second timing signal being created, offset from the first by a degree of offset corresponding to the count at which the second circuit is triggered.

The degree of advance is controlled by another circuit, the genlock monitoring and control circuit 43 which is connected to the timing reference encoding circuit 42. The timing reference encoding circuit 42 is further connected to a digital coding multiplexing and serialising circuit 44 which is connected to inputs of one or more optical transmitters 48. Outputs of these optical transmitters 48 are directly connectable, via dedicated plugs and connectors, to the cable 4. As stated above, in addition to these additional modules the second adapter 5 comprises also modules described in relation with FIG. 3. The second adapter 5 thus comprises also one or more analog-to digital converters 49 and one or more digital interfaces 50 which inputs can be directly connected, via dedicated plugs and connectors, to the remote equipment and which roles is respectively to convert or convey other signals than the timing reference signal coming out from the remote equipment 7 (audio, intercom, etc).

The second adapter of an adapter system according to the first embodiment comprises also a de-serialising de-multiplexing and digital decoding circuit 45 which outputs are in this case connected to a digital video frame synchroniser 46 which can delay the program video sent by the video camera equipment 1 by up to a video frame period. The delay of the synchroniser 46 is controlled by the genlock monitoring and control circuit 43 that is also connected to the synchroniser 46. Outputs of the digital video frame synchroniser 46 are connected to one or more digital-to-analog converters 47 and to one or more digital interfaces 47'. Outputs of these converters 47 and digital interfaces 47' can be directly connected, via dedicated plugs and connectors, to the remote equipment 7. As described in relation with FIG. 3, the de-serialising de-multiplexing and digital decoding circuit 45 is also connected to one or more digital-to-analog converters 40 and to one or more digital interfaces 40' which outputs can be directly connected, via dedicated plugs and connectors, to the remote equipment 7.

The genlock monitoring and control circuit 43 compares the timing of the adjusted version of the digital representation of the timing reference signal provided by the timing reference encoding circuit 42 with the output program video being output by the second adapter to the remote equipment. Without advancing the reference or delaying the program video, the program video would be later than the timing reference by an amount equal to the sum of the propagation delay of the timing reference through the second and first adapters, through the fibre optic plus the delay of the program video through the first and second adapters plus the fibre optic. The genlock monitoring and control circuit 43 thus controls the timing reference encoding circuit 42 to advance the timing reference going to the camera until the program video output of the second adapter is co-timed with the timing reference. This control can be a simple feedback loop comparing the timing of the reference and program video and adjusting the advance in proportion. This may however not be achieved due to the camera not having a timing reference input, or due to a faulty installation. This is detected by the genlock monitoring and control circuit 43 because the feedback loop output will dictate maximum advance but the program video will still be later than the timing reference. If so, the genlock monitoring and control circuit 43 controls the program video frame synchroniser 46 to bring the program video into synchronisation with the timing reference. In addition to this, the video frame synchroniser 46 may also be used to freeze the program video if the signal from the camera is lost. The video frame synchroniser 46 is moreover able to mask picture disturbances Advantageously, the digital coding multiplexing and serialising circuit 44 is implemented in a programmable logic device and so is the de-serialising de-multiplexing and digital decoding circuit 45.

Preferably, analogue signals received from the camera can be reconstructed as digital signals at the remote adapter and it is also possible that digital signals received from the camera are reconstructed as analogue signals at the remote adapter.

Alternatively, signals received from the camera can also be processed before being reconstructed at the remote adapter. The processing may include picture modification, such as gain or black level adjustment, or conversion of picture raster, for example conversion from high definition to standard definition.

In a third embodiment of the adapter system, both the first 3 and second 5 adapters comprise a wavelength division multiplexer which inputs can be connected, via dedicated plugs and connectors, to the cable 4 and which allow splitting the combined optical signal amongst independent optical transducers. Such wavelength division multiplexing allows fewer optical fibres to be used to convey the signals.

FIG. 5 partially shows the second adapter 5 according to a fourth embodiment of the adapter system according to the invention. In this embodiment, additional modules are included in the second adapter that can then be used in conjunction with a power supply that sends power to the first adapter for powering the camera. In this embodiment, the cable 4 used for connecting the first and second adapter must be a hybrid cable comprising two optical fibres and one or more copper conductors.

In this embodiment, the first adapter 3 further comprises a power converter circuit that takes the power from the copper conductors of the hybrid cable and converts the power to a voltage suitable for powering the camera.

The second adapter 5 comprises a line input 51 which may be connected to mains power and which is connected to a power supply circuit 52. This circuit 52 comprises an isolated secondary circuit 52'. The power supply output terminals 53 and 54 are part of the secondary circuit isolated from the line. These terminals are balanced about the protective earth (ground) by two high impedance resistors 55 and 56. The power supply output terminals 53 and 54 are connected to an over current breaker circuit 57 that disconnects the output if an excessive current flows, for example if a short circuit occurs. The output of the over current breaker circuit 57 is connected to a residual current breaker 58 that isolates the output if the current flowing in each conductor differs by more than a safe threshold which indicates that current is flowing to earth or ground. The residual current breaker 58 is connected to an isolating relay 59 that disconnects the output when a fault is detected. The second adapter further comprises a voltage balance trip circuit 60 that is connected to the two terminals 53 and 54 of the power supply and the protective screen and which controls the isolating relay 59. The voltage balance trip circuit 60 compares the potential of the two terminals 53 and 54 of the power supply relative to the protective screen and, if the balance is beyond normal operating specification, it isolates the output. This configuration of the second adapter increases the safety of the installation, for example in cases where the cable 4 is damaged.

The advantages of installation according to the present invention are thus the following.

Professional cameras that can be locked to a timing reference or much lower cost cameras may be used while always providing an output timed to the house reference. Moreover, automatic detection of the need for synchronisation of the signal from the camera allows fault conditions to be remedied without undue disruption to program output.

Another advantage of the invention is that the equipment can be used with cameras regardless of their capability to lock to timing reference signal or otherwise. This is done without the need to fit an external synchroniser or manually reconfigure the apparatus.

Another advantage of the invention is that it can recover from a fault in the timing reference connection to the camera with only brief disturbance rather than loss of lock of the picture.

In addition, the present invention can use a safety circuitry that rapidly disconnects the hazardous voltages when hazardous currents flow either to earth or to the protective screen. Should the protective earth screen and one of the internal insulation layers be scraped away, this circuitry is triggered for example if a human touches the exposed power conductor so that hazardous current start to flow to earth or the outer protective screen.

The invention claimed is:

1. Adapter for processing electrical signals in an installation comprising a video camera equipment and a remote equipment, said adapter comprising:
    a digital coding multiplexing and serialising circuit,
    one or more optical transmitters, which inputs are connected to the digital coding multiplexing and serialising circuit,
    a de-serialising de-multiplexing and digital decoding circuit,
    one or more optical receivers, which outputs are connected to the de-serialising de-multiplexing and digital decoding circuit,
    a timing reference encoding circuit, able to provide an adjusted version of the digital representation of a timing reference signal, which output is connected to the digital coding multiplexing and serialising circuit,
    a video frame synchroniser, able to delay a program video output, and
    a genlock monitoring and control circuit, able to compare the timing of the program video output and the adjusted version of the digital representation of the timing reference signal provided by the timing reference encoding circuit, able to control both the timing reference encoding circuit and the video frame synchroniser and able to adjust the timing reference encoding circuit to match the timing of the program video output to the adjusted version of the digital representation of the timing reference signal provided by the timing reference encoding circuit or to control the video frame synchroniser to synchronise the program video output to the adjusted version of the digital representation of the timing reference signal provided by the timing reference encoding circuit.

2. Adapter according to claim 1, wherein said adapter comprises a first set of one or more analog-to-digital converters which outputs are connected to the digital coding multiplexing and serialising circuit.

3. Adapter according to claim 1, wherein said adapter comprises a first set of one or more digital interfaces which outputs are connected to the digital coding multiplexing and serialising circuit.

4. Adapter according to claim 1, wherein said adapter comprises a first set of one or more digital-to-analog converters which inputs are connected to the de-serialising de-multiplexing and digital decoding circuit.

5. Adapter according to claim 1, wherein said adapter comprises a second set of one or more digital interfaces which inputs are connected to the de-serialising de-multiplexing and digital decoding circuit.

6. Adapter according to claim 1, wherein said adapter comprises a second set of one or more analog-to-digital converters which outputs are connected to the timing reference encoding circuit.

7. Adapter according to claim 1, wherein said adapter comprises a third set of digital interfaces which outputs are connected to the timing reference encoding circuit.

8. Adapter according to claim 1, wherein said adapter comprises a fourth set of digital interfaces which inputs are connected to the video frame synchronizer.

9. Adapter according to claim 1, wherein said adapter comprises a second set of one or more digital-to-analog converters which inputs are connected to the video frame synchroniser.

10. Adapter according to claim 1, wherein the timing reference encoding circuit comprises adjusting means able to delay the digital representation of the timing reference signal for providing the adjusted version of the digital representation of the timing reference signal.

11. Adapter according to claim 1, wherein the timing reference encoding circuit comprises adjusting means able to advance the digital representation of the timing reference signal which allow for providing the adjusted version of the digital representation of the timing reference signal.

12. Adapter according to claim 1, wherein the video frame synchroniser is able to freeze the video program output and to mask picture disturbances.

13. Adapter according to claim 1, wherein said adapter comprises a power supply circuit fed from a line input, a high impedance circuit able to balance the potential of the output terminals of the power supply circuit with ground, a voltage balance trip circuit which compares the potential of the two output terminals of the power supply circuit relative to a protective screen and which is able to isolate the output terminals, an isolating device that is activated when the voltage balance trip circuit detects an imbalance, an over current breaker circuit which is able to disconnect the output terminals if an excessive current flows and a residual current breaker that isolates the output terminals if the current flowing in each conductor differs by more than a safe threshold.

14. Adapter system for processing electrical signals in an installation comprising a video camera equipment and a remote equipment, said system having a first adapter,
    said first adapter comprising:
    a digital coding multiplexing and serialising circuit,
    one or more optical transmitters which inputs are connected to the digital coding multiplexing and serialising circuit,
    a de-serialising de-multiplexing and digital decoding circuit,
    one or more optical receivers which outputs are connected to the de-serialising de-multiplexing and digital decoding circuit,
    wherein said adapter system comprises a second adapter according to claim 1.

15. Adapter system according to claim 14, wherein said first adapter comprises a power converter circuit.

16. Adapter system according to claim 14, wherein said first adapter and said second adapter comprise a wavelength division multiplexer which is able to split a combined optical signal in several independent optical signals.

17. Adapter system according to claim 14, wherein said first adapter and said second adapter are connected by a cable comprising at least one optical fibre.

18. Adapter system according to claim 14, wherein said first adapter and said second adapter are connected by a cable comprising at least one optical fibre and copper conductors.

* * * * *